United States Patent

Simmons

[11] Patent Number: 6,022,506
[45] Date of Patent: Feb. 8, 2000

[54] DEVICE FOR CUTTING CIRCULAR OPENINGS IN PIPE, VESSELS, AND FLAT MATERIAL

[76] Inventor: Charles W. Simmons, P.O. Box 5485, Pasadena, Tex. 77508

[21] Appl. No.: 09/275,828

[22] Filed: Mar. 25, 1999

[51] Int. Cl.[7] ............................................. B23K 7/00
[52] U.S. Cl. .................................. 266/54; 266/70; 266/62
[58] Field of Search ................................. 266/48, 54, 62, 266/63, 70

[56] References Cited

U.S. PATENT DOCUMENTS

| | | | |
|---|---|---|---|
| 866,866 | 9/1907 | Jottrand | 266/70 |
| 1,991,117 | 2/1935 | Porteous et al. | 266/54 |
| 2,497,853 | 2/1950 | Arnold et al. | 266/54 |
| 3,388,901 | 6/1968 | Fergurson | 266/70 |
| 4,411,410 | 10/1983 | Sumner | 266/54 |
| 5,159,756 | 11/1992 | McGuire | 30/92 |

*Primary Examiner*—Scott Kastler
*Attorney, Agent, or Firm*—Michael B. Jolly

[57] ABSTRACT

A circle cutting device that is particularly useful for cutting openings through pipe and round vessels and may also be utilized for cutting circular openings through flat material. The device utilizes a conventional oxygen acetylene cutting torch or plasma cutter and also may be angled to provide a means for bevel cutting circular openings at a desired angle. The device is portable and easily used in field operations by a craftsman.

3 Claims, 4 Drawing Sheets

DEVICE FOR CUTTING CIRCULAR OPENINGS IN PIPE, VESSELS, AND FLAT MATERIAL

TECHNICAL FIELD

The present invention relates to devices and methods for cutting circular openings in pipe, vessels and flat material and more particularly to a device which is hand operated and easily adapted for use to cut either straight or beveled circular openings utilizing a conventional oxygen acetylene cutting torch or plasma cutter.

BACKGROUND ART

There are many instances where a fabricator, welder, or pipe fitter is required to cut openings in metal vessels, pipe, or flat stock material. These craftsman must perform a particular task, quickly and efficiently in order to maintain an economic advantage. There have been numerous devices designed and patented which utilize oxygen acetylene cutting torches or plasma cutters to facilitate circular cutting. Additionally, there have been complex machines designed to assist a fabricator or a pipe fitter to cut circular openings in pipes and/or vessels. Although these prior art devices provide useful tools for there given purposes, there has never been a tool designed as the present invention which is adaptable to cut circular openings on both curved and flat material without the need for templates or other guiding means. Additionally, the present invention is adaptable to bevel cut the cut opening in pipe and vessels at a desired angle. Providing a beveled cut is particularly difficult when attempting to cut an opening in a pipe or a round vessel, but is extremely important in order to properly weld a nozzle or other joining piece to the opening. The present invention provides a tool that allows the user to easily effectuate bevel cuts at a desirable angle and maintain the bevel cut while cutting the opening.

Examples of two prior art designs of apparatuses for cutting openings in pipe and/or vessels are disclosed in U.S. Pat. No. 5,159,756 and U.S. Pat. No. 4,411,410. As can be seen from these patents, they are particularly useful in cutting openings in round vessels or pipe however the devices are unduly complicated for most fabricators and welders especially those who desire to provide services on a mobile bases. The present invention is entirely portable, lightweight, and maybe adaptable to be used in numerous circumstances.

GENERAL SUMMARY DISCUSSION OF INVENTION

It is thus an object of the invention to provide a circle cutting device that is particularly useful for cutting openings through pipe and round vessels and may also be utilized for cutting circular openings through flat material.

It is a further object of the invention to provide a circle cutting device adaptable for use with a conventional oxygen acetylene cutting torch or a plasma cutter and which provides a means for bevel cutting circular openings at a desired angle.

It is a still further object of the invention to provide a circle cutting device that is portable and easily used in field operations by a craftsman and which does not require templates or other guidance means for cutting the opening.

Accordingly, a circle cutting device is provided which is particularly useful for cutting circular openings through pipe, round vessels, and flat material which may be adapted to bevel cut at various angles as desired by the user, and which device is entirely portable and utilizes a standard oxygen acetylene cutting torch or plasma cutter.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 4a is a top view of a section of pipe or a round vessel with a round opening marked for facilitating a cut there through.

EXEMPLARY MODE FOR CARRYING OUT THE INVENTION

Figure 1:
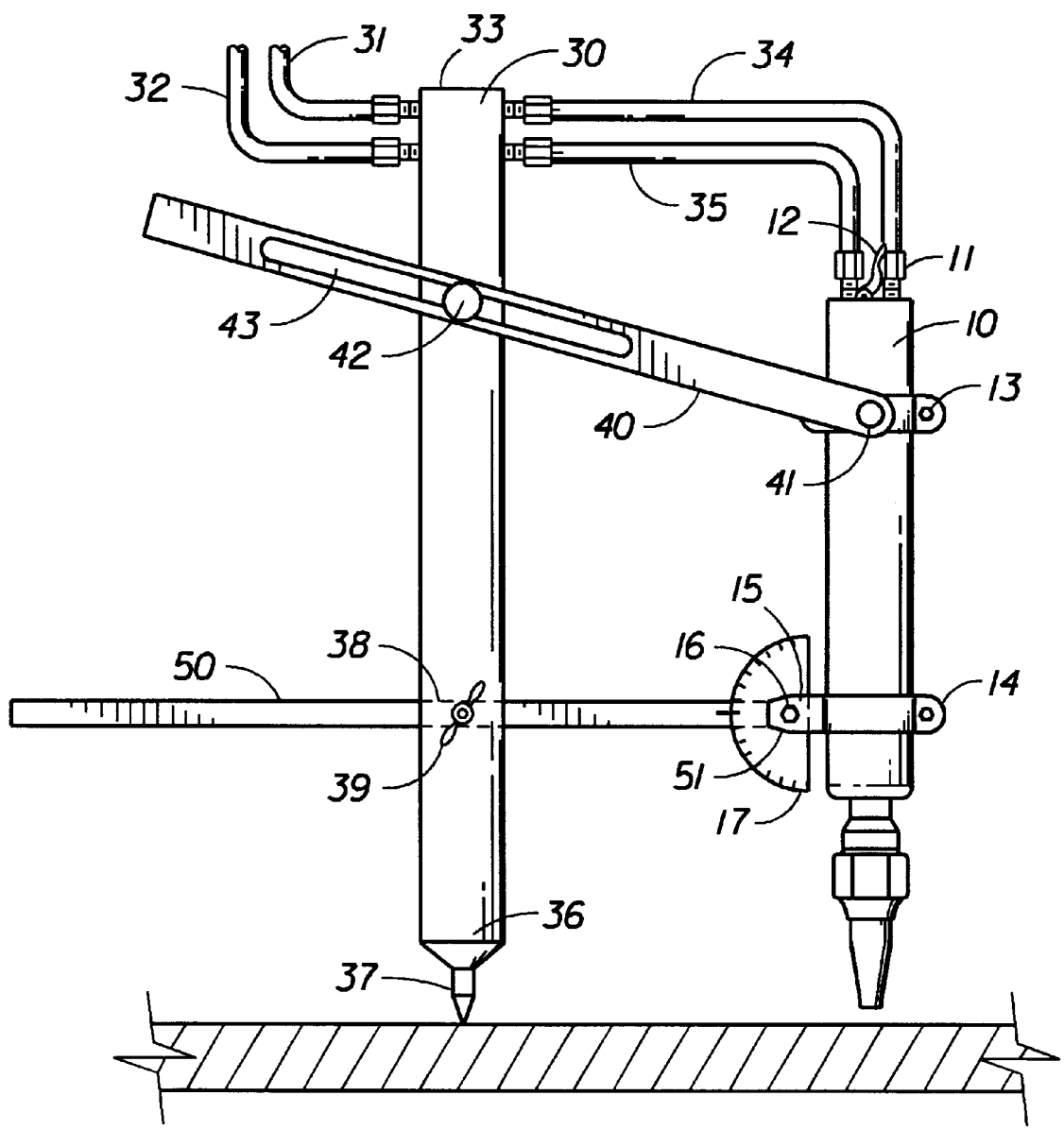
FIG. 1 is a side plane view of the circle cutting device with the cutting torch positioned perpendicular to the surface to be cut.
Figure 2:
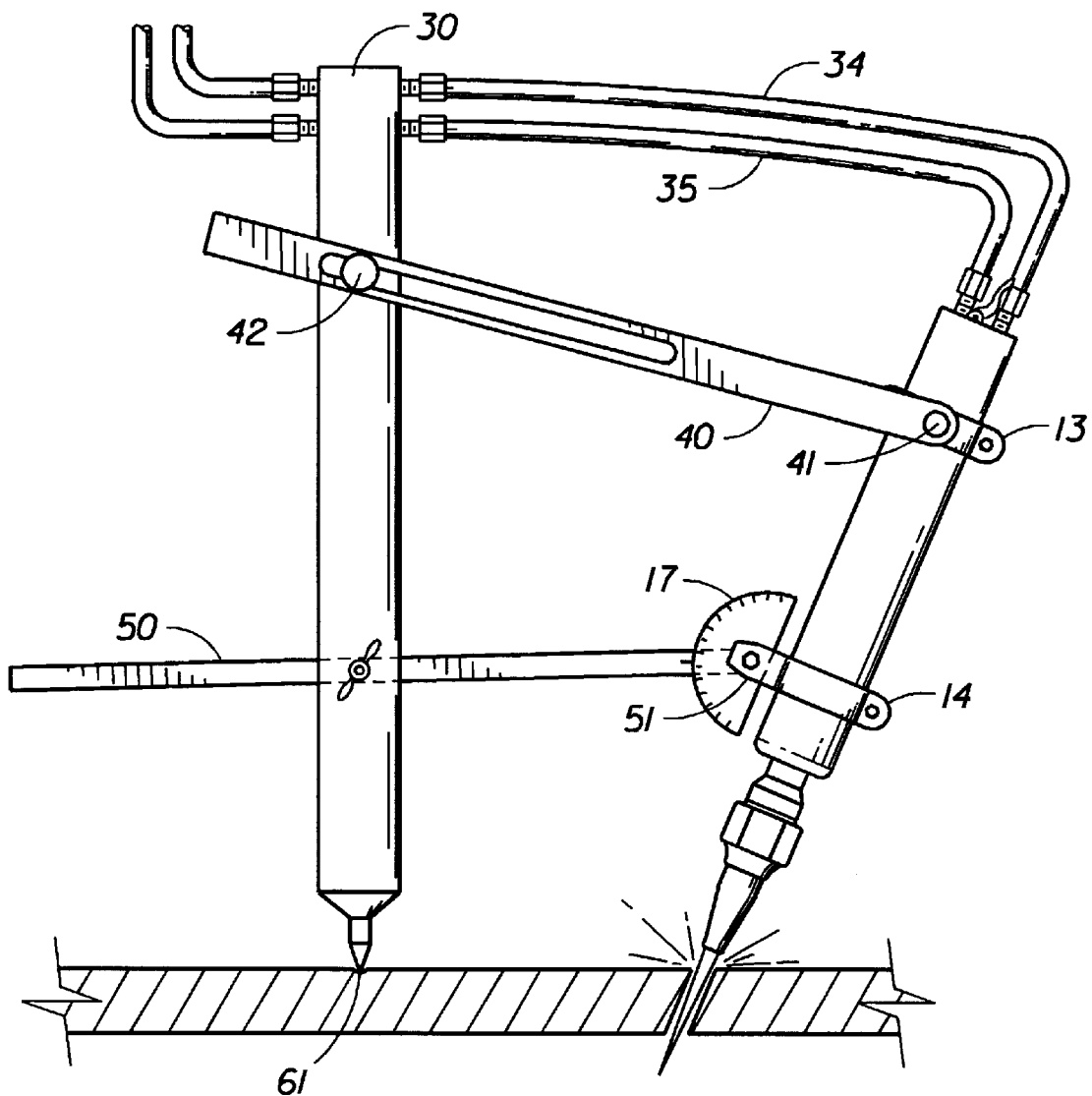
FIG. 2 is a side plane view of the circle cutting device with the cutting torch head angled at approximately thirty degrees for facilitating a bevel cut through the material.
Figure 3:
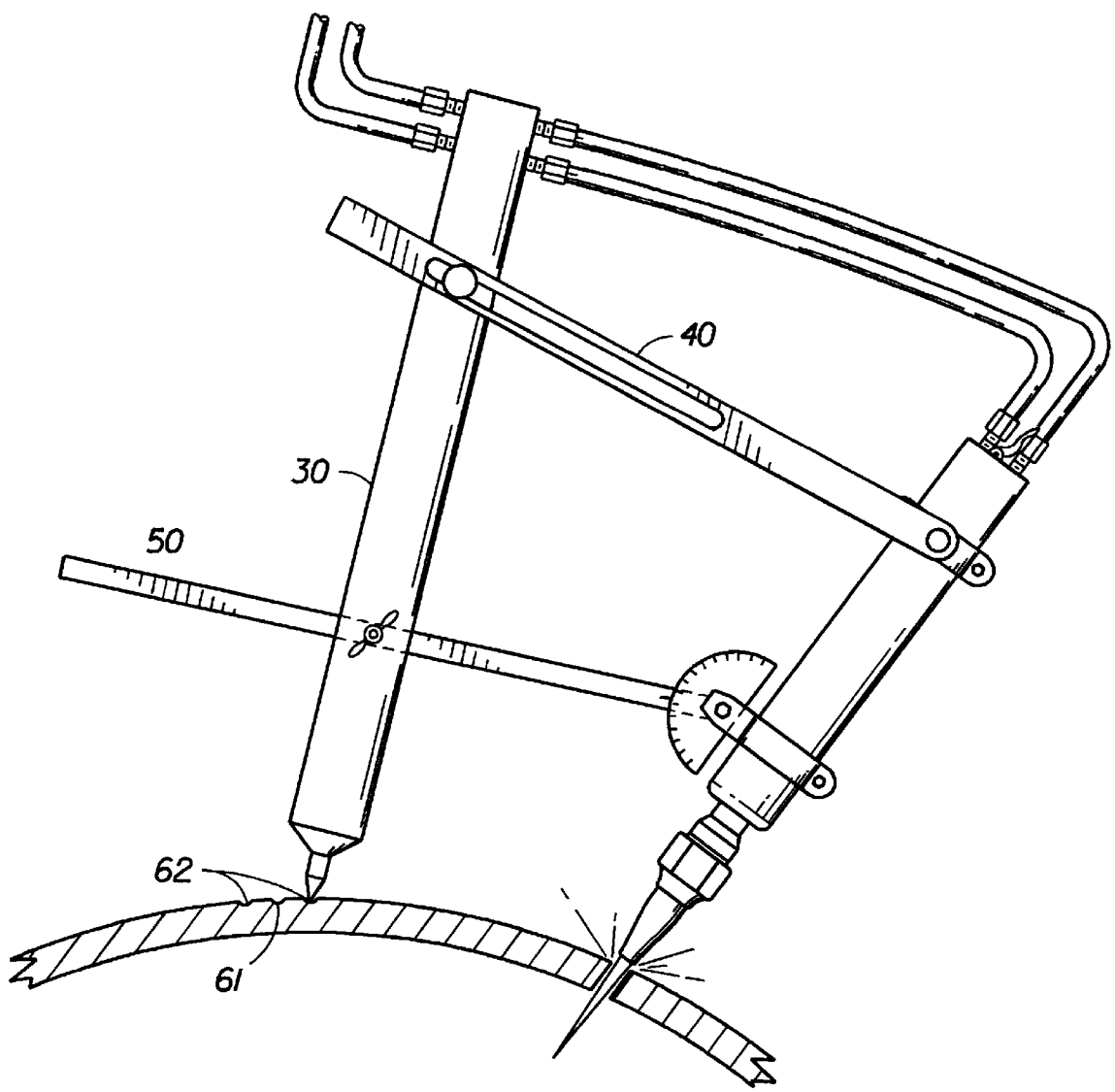
FIG. 3 is a side plane view of the circle cut device positioned on a pipe or round vessel with the cutting torch head angled at approximately thirty degrees for facilitating a bevel cut through the material.

It can be seen from the preceding description that the circle cutting device is entirely portable and may be adjusted for cutting different radius circular openings while also facilitating a bevel cut at a desired angle. The main component parts of the device include a conventional oxygen acetylene track cutting torch 10 or plasma cutter, a round support post 30, an upper control arm 40, and a lower support arm 50. Throughout the description and the figures, an oxygen acetylene cutting torch is illustrated clamped in the device, this cutting torch may be replaced with a plasma cutting device that may be clamped and utilized in similar fashion.

The oxygen acetylene cutting torch 10 is preferably a standard track cutting torch which is an elongated cylindrical shape, with tubular connections at a top end 11 and the oxygen valve 12 also mounted on the top. An upper circular clamp 13 is slidingly mounted to the cylindrical cutting torch and includes a pivotal mount 41 for pivotally mounting to the upper control arm 40. The upper control arm 40 is mounted to the support post 30 by a mounting post 42 so that the upper control arm 40 may be easily elongated and pivoted about the mounting post 42. The longitudinal axis of mounting post 42 is perpendicular to a longitudinal axis of the support post. The upper control arm 40 is mounted to one side of the clamp 13 so that the upper control arm 40 is mounted in alignment with its mounting position on support post 30. The pivotal mount 41 has a center axis that bisects a diameter of the upper circular clamp 13. This pivotal mount 41 allows the upper clamp, and the torch clamped therein, to be pivoted and clamped at a specific angle in relation to the support post. A lower circular clamp 14 is also slidingly clamped to the cylindrical cutting torch while the lower support arm 50 is mounted about ninety degrees from the upper control arm mounting on the upper clamp 13. The lower circular clamp 14 includes mounting tabs 15 which extend from an outside edge of the lower clamp and through which is an aperture 16 for pivotally mounting the lower clamp 14 thereon. The pivotally mounted upper control arm 40, pivotally mounted upper clamp 13, the pivotally mounted lower clamp 14 and the extendable lower support arm 50 allow the cutting torch to be adjusted in height, radius of cut and angle of cut. All pivotal mounts may be locked in place by a bolt and/or nut which extend through each pivotal mount. Additionally, both clamps 13 and 14 may be securely positioned on the cylindrical cutting torch so that the adjustments and positioning of the tool are fixedly secured prior to use.

Support post 30 is preferably about twelve inches to twenty four inches tall and constructed of solid lightweight material such as round aluminum stock. The oxygen and acetylene supply lines 31 and 32 are illustrated in the figures connected to the upper part of the post 30. The oxygen acetylene cutting torch leads 34 and 35 extend from the upper part of the post to the cutting torch for connection to the cutting torch. These short leads 34 and 35 are preferably supplied in a length which allows for full adjustment of the cutting torch head at any position allowable by sliding the upper control arm to its full extendable length and also the lower support arm 50. Connection of the oxygen and acetylene lines to the upper part of the support post provides a means for insuring that the hoses are out of the user's path preventing disruption and operation of the circular cutting. The lower end of the support post 36 includes a hardened pivot point 37 which is preferably constructed of material similar to a center punch.

Upper control arm 40 is preferably about 1 foot to about 3 feet in length and includes a slidable attachment for extending the cutting torch which is pivotally attached thereto. The upper control arm 40 is also constructed of flat material about one inch in height and about three eighths to about one quarter inch thick to provide sufficient rigidity. The figures illustrate a grooved or slotted section 43 which provides for extending the upper control arm and the torch attached thereto. The slot 43 may be extended or there may be multiple slots provided in the upper control arm.

The lower support arm 50 is preferably a rod of about one foot to about three feet in length and is inserted through an aperture 38, the longitudinal axis of the aperture extends through the body of the support post and is perpendicular to the longitudinal axis of mounting post 42. The rod 50 is slidably adjustable through the aperture 38 and is locked in place utilizing screw clamp 39. One end of the rod 50, as described above, is pivotally mounted 51 to the cutting torch lower clamp 14. A degree gradient plate 17 may be fixedly secured to the lower clamp 14 and is aligned with the lower arm 50 so that as the cutting torch is pivoted in relation to the lower arm, the degree of angle between the cutting torch and the pivot post can be ascertained. After the angle adjustment is set by the user the pivot clamp 51 is locked in place. The radius of the circular cut is adjusted utilizing clamps at pivot or elongation points 39, 42 and 41. After the radius is set by the user these three clamps are secured and the tool is ready to be used.

Figure 4A:
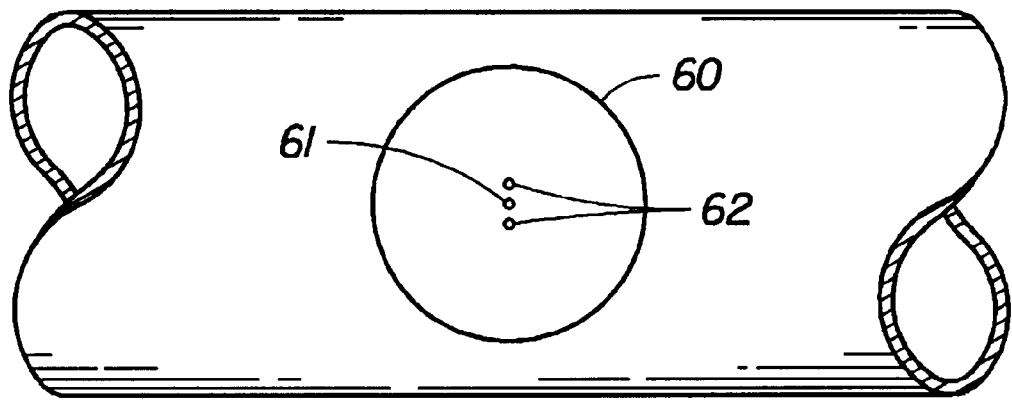
Figure 4B:
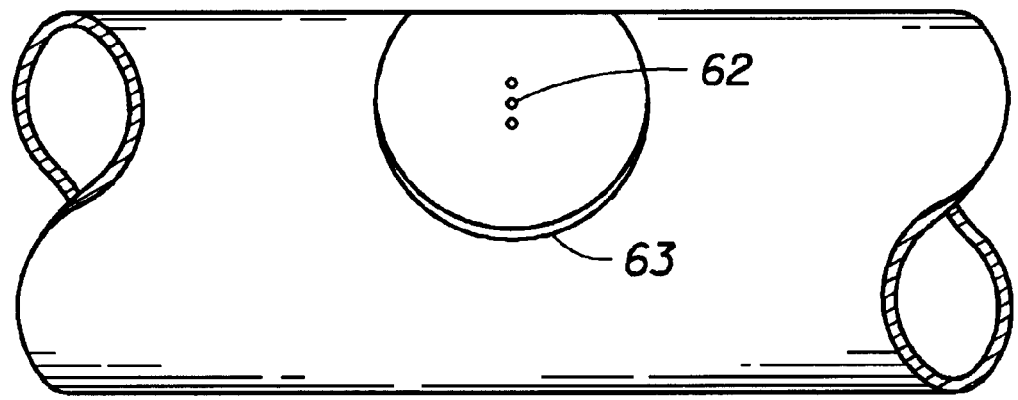
FIG. 4b is a top view of FIG. 4a with the pipe rotated approximately fifteen to twenty degrees illustrating the marking for facilitating a round opening cut through the pipe and/or a round vessel.

FIGS. 4a and 4b illustrate a typical circle marked on a pipe in order to cut an opening there through. FIG. 4a illustrates a top view of the circle mark which will be cut through the pipe 60 with a center punch mark 61 and two additional punch marks 62 laterally aligned on opposing sides of the center punch mark 61. As known by those skilled in the art, marking a circular opening through a pipe or round vessel requires the craftsman to compensate for the curved surface to be cut which results in a non-circular opening when viewing the opening from any angle other than a direct top view. FIG. 4b illustrates a slightly rotated view of FIG. 4a where the sides 63 extends slightly further than a true circular mark. The laterally placed center punch mark 62 which is closest to a given side portion 63 would be a new center pivot point for the circle cutting device as the device is rotated towards the lower section 63 of the circle to be cut. Accordingly, when the user utilizes the circle cutting device on a round vessel or a pipe, there must be three center punch marks made as illustrated in FIG. 4a. The marking of the opening to be cut can be accomplished utilizing a hand method or any number of marking devices available to those skilled in the art. Preferably, the user would begin utilizing the present invention by rotating from the center punch mark and cutting the pipe or round vessel surface which is in alignment and on the same plane as that punch mark. As the user rotates the circle cut device around the pipe to the lower sections 63 of the circle to be cut the user switches the pivot point to the corresponding center punch mark 62 closest to that outside edge. The user would then switch from center punch mark 62 back to the center punch mark 61 and then again back to the opposing lateral center punch mark 62 for the other portions of the circle to be cut.

It is noted that the embodiment of the circle cutting device as described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A device for cutting circular openings in pipe, vessels and flat material utilizing an elongated cylindrical oxygen/acetylene cutting torch or plasma cutter, the device comprising:

a) a support post comprising an elongated upright support member with a hardened pivot point positioned at a bottom end thereof for rotation of the device about a center point of a circle to be cut, b) a horizontally positioned upper control arm extendible and pivotally attached to a mounting post extending perpendicular from a side on the support post and near a top end of the support post, an upper circular clamping member is pivotally mounted to one end of the upper control arm allowing the upper circular clamping member to pivot about a line bisecting a diameter of a circular interior of the upper circular clamping member, the circular interior of the upper circular clamping member is dimensioned to slidingly receive an upper end of the elongated cylindrical cutting torch or plasma cutter and further to snugly clamp the cutting torch or plasma cutter in a desired position, the upper circular clamping member which is pivotally mounted to one end of the upper control arm allows an angle of the cutting torch or plasma cutter to be adjusted in relation to the support post while the extendible and pivotally mounted upper control arm allows adjustment of the device to coincide with a radius of a circle to be cut, and c) a horizontally positioned lower support arm extendible attached through a centrally positioned aperture through the support post which aperture is aligned perpendicular to the longitudinal axis of the support post and positioned below the upper control arm, a longitudinal axis of the centrally positioned aperture is perpendicular to the longitudinal axis of the upper control arm mounting post, a lower circular clamping member with a mounting tab extending from an outside edge is pivotally mounted to one end of the lower support arm and coincides with the positioning of the upper clamping member on the upper control arm, the lower circular clamping member is mounted to pivot about a mounting aperture positioned through the mounting tab wherein the mounting aperture is perpendicular to a center axis of a circular interior of the lower circular clamping member and the center axis of the mounting aperture does not bisect the circular interior of the lower circular clamping member, the circular interior of the lower circular clamping member is dimensioned to slidingly receive a lower end of the elongated cylindrical cutting torch or plasma cutter and further to snugly clamp the cutting torch or plasma cutter in a desired position, the pivot mount of the lower clamping member to the lower support arm allows an angle of the cutting torch or plasma cutter to be adjusted in relation to the support post while the extendible mounted lower support arm allows adjustment of the device to coincide with a radius of a circle to be cut.

2. The device for cutting circular openings in pipe, vessels and flat material of claim 1, wherein the device further comprises, an angle gauge positioned on the lower circular clamp and in alignment with the lower support arm so that an angle may be ascertained between a longitudinal axis of the elongated cylindrical cutting torch or plasma cutter and a longitudinal axis of the lower support arm.

3. The device for cutting circular openings in pipe, vessels and flat material of claim 1, wherein the device further comprises, oxygen and acetylene tubing supports positioned on an upper end of the support post.

* * * * *